H. W. PLEISTER AND J. KARITZKY.
CONDUIT OR CABLE CLAMP AND BRIDLE RING.
APPLICATION FILED JAN. 23, 1920.
1,365,619.
Patented Jan. 11, 1921.
2 SHEETS—SHEET 1
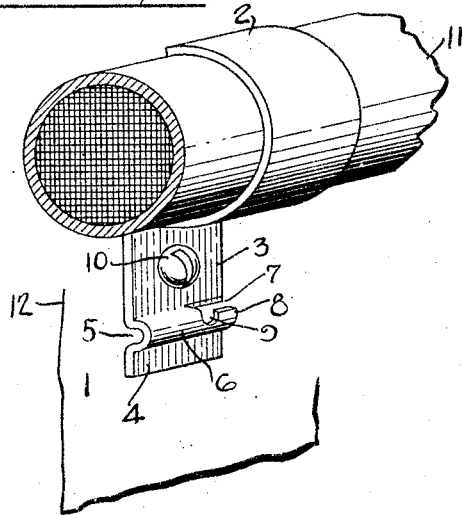
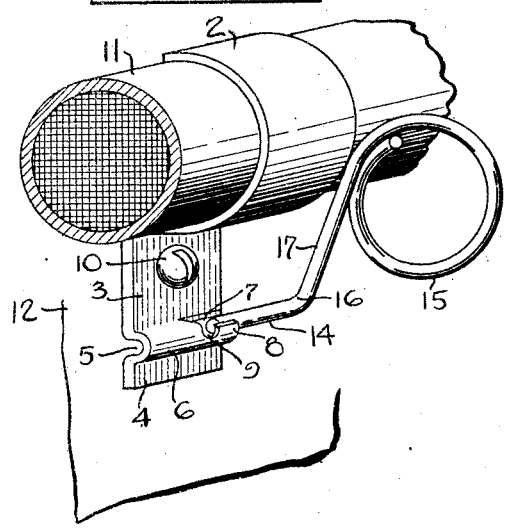
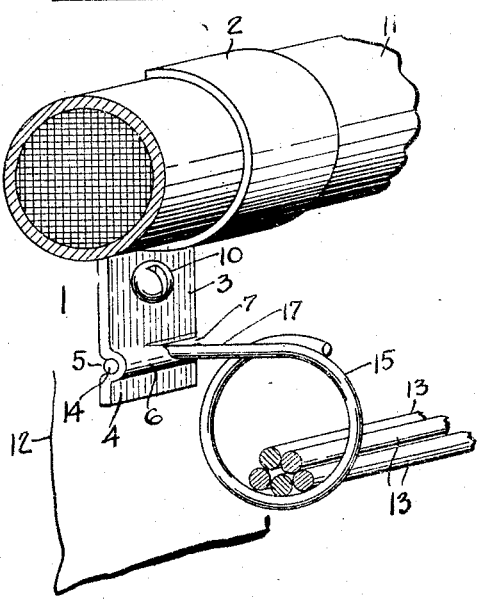
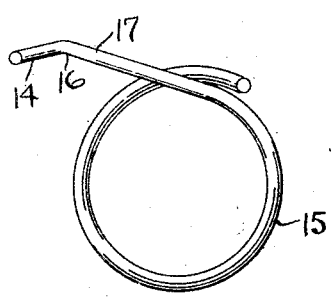
Henry W Pleister
John Karitzky
INVENTORS
BY
Charles Johnson
ATTORNEY H. W. PLEISTER AND J. KARITZKY.
CONDUIT OR CABLE CLAMP AND BRIDLE RING.
APPLICATION FILED JAN. 23, 1920.
1,365,619.
Patented Jan. 11, 1921.
2 SHEETS—SHEET 2.
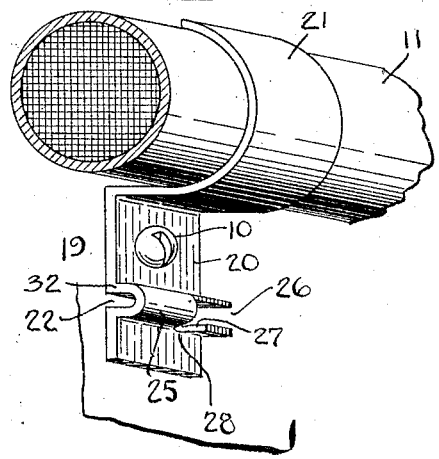
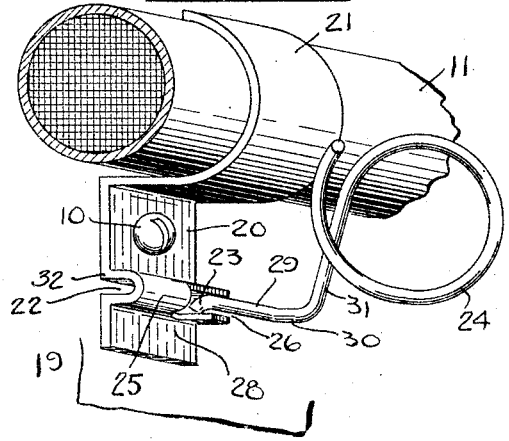
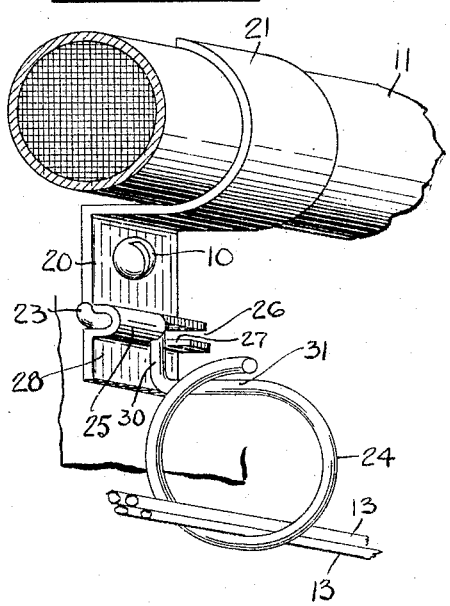
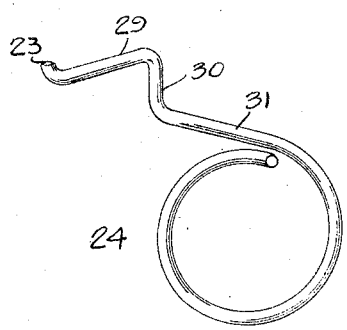

UNITED STATES PATENT OFFICE.

HENRY W. PLEISTER, OF WESTFIELD, AND JOHN KARITZKY, OF GARWOOD, NEW JERSEY, ASSIGNORS TO HENRY B. NEWHALL, JR., EXECUTOR OF HENRY B. NEWHALL, DECEASED.

CONDUIT OR CABLE CLAMP AND BRIDLE-RING.

1,365,619.  Specification of Letters Patent.  Patented Jan. 11, 1921.

Application filed January 23, 1920. Serial No. 353,625.

*To all whom it may concern:*

Be it known that we, HENRY W. PLEISTER, a citizen of the United States, residing at Westfield, in the county of Union and State of New Jersey, and JOHN KARITZKY, a citizen of the United States, residing at Garwood, in the county of Union and State of New Jersey, have invented certain new and useful Improvements in Conduit or Cable Clamps and Bridle-Rings, of which the following is a specification, taken in connection with the accompanying drawings.

Our invention relates to the combination of a conduit or cable clamp and bridle ring, and also to a cable or conduit clamp and a bridle ring as sub-combinations of the main combination, and as articles of manufacture.

Our invention further relates to a cable or conduit clamp, which can be manufactured at minimum expense and to which a bridle ring may be secured either at the original installation of the cable and conduit clamp, or at any future time when it may be desirable to support one or more runs of bridle wires.

Our invention further relates to a conduit or cable clamp provided with a socket or recess to receive the shank of a nonthreaded pig tail bridle ring.

While our conduit or cable clamp is preferably formed out of pressed sheet material as pressed steel, it may be formed from castings of malleable iron, brass, an alloy, aluminum or any other metal, or it may be made out of pressed fibrous material.

Our invention further relates to certain combinations, sub-combinations, articles of manufacture, and details of construction, all of which will be more fully hereinafter described and pointed out in the claims.

In the figures in which we have shown different embodiments of our invention, by way of example, the same reference numerals refer to similar parts in the several figures.

Figure 1 is a perspective view of one form of our conduit or cable clamp and of a cable which it supports;

Fig. 2 is a perspective view of our conduit or cable clamp and of our pig tail bridle ring in its first position of being inserted in the socket or recess in the clamp;

Fig. 3 is a perspective view of our conduit or cable clamp and of our pig tail bridle ring positioned in the socket or recess;

Fig. 4 is a perspective view of one form of pig tail bridle ring;

Fig. 5 is a perspective view of another form of our conduit or cable clamp and of the cable which it supports;

Fig. 6 is a perspective view of the conduit or cable clamp shown in Fig. 5, with a different form of pig tail bridle ring in its first position of being inserted in the socket or recess in the clamp;

Fig. 7 is a perspective view of our conduit or cable clamp shown in Fig. 5 with the pig tail bridle ring positioned in the recess or socket of the clamp;

Fig. 8 is a perspective view of the pig tail bridle ring used with the clamp shown in Figs. 5, 6 and 7.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By our invention our original conduit or cable clamp may be used as a separate article of manufacture or sub-combination, and then later, when the needs of the service demands it, our bridle ring may be supported by the same conduit or cable clamp, when the complete combination would be used.

In our invention we form our conduit or cable clamp 1 with a hook portion 2 and a base 3. Preferably, though not necessarily, our conduit or cable clamp is formed of pressed sheet metal. Near the bottom portion 4 of the base 3 we form an integral socket or recess 5 by crimping or bending the base when it is made of pressed sheet material. We cut away a portion of the crimped metal 6 to form a slot 7. Preferably we also form the lower wall 8 of the slot with a cut-out portion or notch 9.

The securing screw 10 holds the conduit or cable clamp 1 to the wall or other suitable support 12 and at the same time holds the cable 11 in position.

Whenever it becomes necessary to increase the capacity of the installation by stringing runs of bridle wires 13, 13 this can easily be done by the linemen, without disturbing the screw 10, inserting the shank 14 of the pig tail bridle ring 15 in the slot 7, Fig. 2. This shank is pressed into the recess 5, in a direction transverse to the longitudinal axis of the conduit or cable clamp 1 until the shoulder 16 engages with the end of the slot 7, when its further movement in this direction is arrested. The pig tail bridle ring 15 is then swung down, or rocked slightly until a portion of it engages in the notch 9, Fig. 3, when it is locked in position. The bridle wires 13, 13 can then be threaded through the bridle ring.

Should it ever be desirable to remove the runs of bridle wires 13, 13 and the pig tail bridle ring 15 this can be expeditiously done by simply rocking the bridle ring 15 in a vertical direction until the arm 17 escapes the notch 9, when the entire bridle ring 15 can be withdrawn by moving it at right angles to the longitudinal axis of the conduit or cable clamp.

In some cases we may form our conduit or cable clamp as shown in Figs. 5 to 8 inclusive. In these figures the cable clamp 19 has a base portion 20 and a hook portion 21 the same as in the other form. The socket or recess 22 is formed by crimping a portion of the base 20, when the conduit or cable clamp is formed out of sheet material, the same as in the other construction except that the socket or recess 22 is preferably formed somewhat larger than in the other construction to permit the passage of the toe 23 of the pig tail bridle ring 8.

In this form the crimped or bent portion is also cut away to form the horizontal slot 26. At the end of this slot 26 we form a vertical slot 27 which is preferably cut down to the surface 28 of the base 20.

The pig tail bridle ring 24, in this form of our invention, is provided with the toe 23, the shank 29, the shoulder 30 and the arm 31.

When it is found that the capacity of the cable 11 is not adequate for the load thrown upon the line, additional runs of bridle wires 13, 13 can be installed on the same conduit or cable clamp 19 without unscrewing the screw 10. It is simply necessary to insert the toe 23 and shank 29 of the pig tail bridle ring 24 into the pocket or recess 22, Fig. 6, the shoulder 30 passing along the horizontal slot 26 until it reaches the end of said slot. The pig tail bridle ring is then rocked downward into the position shown in Fig. 7, when the shoulder 30 will move down the vertical slot 27 until it reaches the end of the slot. This will permit the shoulder 30 to engage with the lower portion 28 of the base and obtain a long support or bearing thereon. The toe 23, when the shank 29 is rocked, serves to engage with the surface 32 of the base 20 thereby forming an additional lock to prevent accidental disengagement of the bridle ring from the conduit or cable clamp.

The pig tail bridle ring is easily disconnected from the conduit or cable clamp by simply reversing the operation first described.

It will be noted that in both forms of our improved construction no tapping or screw-threading of the conduit or cable clamp is required, nor is it necessary to place screw-threads upon our pig tail bridle rings. This of course saves considerable expense in the manufacture of the article and reduces the amount of metal or material necessary to make the conduit or cable clamp.

Having thus described this invention in connection with illustrative embodiments thereof, to the details of which we do not desire to be limited, what is claimed as new and what is desired to secure by Letters Patent is set forth in the appended claims.

What we claim is:—

1. A conduit or cable clamp provided with a pocket or recess extending from side to side of the clamp, said pocket or recess having a slot extending substantially parallel to and communicating with the recess and extending part way across the clamp, the slot being provided with a notch, said pocket or recess and said slot and notch being adapted to coöperate with a bridle ring.

2. The combination of a conduit or cable clamp having a hook portion and a base, means to secure the clamp to a wall or other suitable support, a pocket or recess provided with a slot, and a bridle ring adapted to be inserted from the side and seated in said pocket or recess and said slot without disturbing the securing means holding the clamp to the wall or other support.

3. The combination of a conduit or cable clamp provided with a hook portion to engage and support a conduit or cable and a base to lie against a wall or other support, means to secure the base to a wall or other support, the base being provided with a transverse pocket or recess having a slot and a bridle ring having a shank which can be attached to and detached from the base without loosening the securing means holding the base to a wall or other support.

4. The combination of a conduit or cable clamp having a base portion provided with a horizontal pocket having a slot extending laterally from one side of the base to the other and communicating with a vertical slot, and a bridle ring having a shank adapted to coöperate with the pocket and slots.

5. The combination of a conduit or cable clamp formed of pressed sheet material provided with a base and hook portion, the base being pressed or crimped to form an integral pocket extending transversely to the longitudinal axis of the clamp, the walls of said pocket being cut away for a portion of their length to form a slot to receive a bridle ring and a pig tail bridle ring having a toe, a securing screw, said bridle ring being adapted to be inserted and withdrawn from the pocket without unloosening the securing screw.

6. The combination of a conduit or cable clamp formed from pressed sheet material having a base and a hook portion the base being bent or crimped to form an integral pocket or recess, the walls of said pocket or recess being cut away to form slots substantially at right angles to each other, and a bridle ring provided with a toe and also provided with a shoulder to bear upon said base said bridle ring coöperating with both of said slots.

7. A pigtail bridle ring provided with a shank, a shoulder at an angle to the shank, the bridle ring being bent at an angle to the shoulder and back on itself to form a pigtail bridle ring, the shank adapted to be received in a bearing in a conduit or cable clamp having a base, the shoulder being adapted to contact with the base and form an extended bearing on the base for the bridle ring.

8. A pigtail bridle ring provided with a shank, a toe at one end of the shank formed at an angle thereto, a shoulder at the other end of the shank and formed at an angle to the shank, the bridle ring being bent at an angle to the shoulder and back on itself to form a pigtail bridle ring, the shank adapted to be received in a bearing in a conduit or cable clamp having a base, the shoulder being adapted to contact with the base and form an extended bearing on the base for the bridle ring and the toe adapted to bear on the side of the base.

HENRY W. PLEISTER.
JOHN KARITZKY.

Witnesses as to the signature of Henry W. Pleister:
MARY R. RYAN,
A. M. WILLIAMS.

Witnesses as to the signature of John Karitzky:
F. W. KARITZKY,
W. A. HESSLER.